(12) United States Patent
Shah et al.

(10) Patent No.: US 12,449,601 B1
(45) Date of Patent: Oct. 21, 2025

(54) MINIATURE OPTICAL PROBE

(71) Applicant: Neptec OS, Inc., Fremont, CA (US)

(72) Inventors: Chintan Shah, Milpitas, CA (US); Chi-Hao Brian Liu, San Jose, CA (US); Jianxun Fang, Milpitas, CA (US)

(73) Assignee: Neptec OS, Inc., Fremont, CA (US)

( * ) Notice: Subject to any disclaimer, the term of this patent is extended or adjusted under 35 U.S.C. 154(b) by 0 days.

(21) Appl. No.: 18/882,708

(22) Filed: Sep. 11, 2024

(51) Int. Cl.
*G02B 6/26* (2006.01)
*G02B 6/32* (2006.01)
*G02B 6/44* (2006.01)

(52) U.S. Cl.
CPC ............. *G02B 6/262* (2013.01); *G02B 6/322* (2013.01); *G02B 6/443* (2013.01)

(58) Field of Classification Search
CPC ......... G02B 6/262; G02B 6/322; G02B 6/443
See application file for complete search history.

(56) References Cited

U.S. PATENT DOCUMENTS

| | | | | |
|---|---|---|---|---|
| 5,815,611 A | * | 9/1998 | Dhadwal | B82Y 15/00 385/12 |
| 2007/0031150 A1 | * | 2/2007 | Fisher | H04B 10/118 398/128 |
| 2008/0177145 A1 | | 7/2008 | Furnish | |
| 2009/0323076 A1 | * | 12/2009 | Li | G01B 9/02063 356/479 |

* cited by examiner

*Primary Examiner* — Michael P Mooney
(74) *Attorney, Agent, or Firm* — Adibi IP Group, PC; Amir V. Adibi; Andrew C. Palmer

(57) ABSTRACT

A miniature probe includes a fiber, a lens, and an optical element. The probe includes a lens for transferring light between the fiber and the optical element. An end face of the lens is fused to an end face of the fiber by application of heat. No epoxy is involved in fusing together the lens and fiber. The lens can be a Gradient-Index (GRIN) lens or a ball lens. The probe is designed to deliver or receive light via the optical element, creating an optical path between the fiber, lens, and optical element. The probe is enclosed within an outer tubing, with a portion of an inner tubing disposed between the fiber and the outer tubing. The outer tubing is transparent, and the probe is designed to handle a wide range of operating wavelengths. The novel fusion process does not involve any adhesive material that may contaminate the optical path.

17 Claims, 9 Drawing Sheets

MINIATURE PROBE

MINIATURE PROBE

FORMING MINIATURE PROBE

INSERT FIBER INTO INNER TUBING (STEP 103)

INSERT INNER TUBING INTO OUTER TUBING (STEP 104)

INSERT OPTICAL ELEMENT INTO OUTER TUBING (STEP 105)

MINIATURE OPTICAL PROBE

TECHNICAL FIELD

The present invention relates generally to optical technology, and more specifically, to probes for light delivery and reception.

BACKGROUND INFORMATION

Optical technology has seen a surge in the development of devices designed for light delivery and reception. A common application of light delivery and reception optical technology is in the context of research, military, telecommunication, medical, and cosmetic applications. Such devices, often referred to as probes, are integral to a variety of procedures, including those involving laser treatments for skin-related conditions. The design and assembly of these probes present complex challenges that require innovative solutions.

SUMMARY

A miniature probe comprises a fiber, a lens, and an optical element. An end face of the fiber is fused to an end face of the lens. The lens is disposed between the fiber and the optical element. An optical path extends between the fiber, lens, and optical element. No epoxy is present along the optical path. The optical element is a reflective surface having a predetermined angle of reflection, or a beam splitter, or another type of optical element. The fiber is coupled to the lens without any intermediate adhesive material. The lens may be a Gradient-Index (GRIN) lens or a ball lens. The fiber may be a single mode fiber (SMF), a multimode fiber (MMF), or a double-clad fiber (DCF).

In various embodiments, the apparatus further includes an outer tubing and an inner tubing. The end face of the fiber, the lens, and the optical element are enclosed within the outer tubing. The outer tubing is transparent. The inner tubing is disposed between the fiber and the outer tubing. The fiber has an outer diameter, the inner tubing has an outer diameter, the outer tubing has an outer diameter, and the optical element has an outer diameter. In one embodiment, the outer diameter of the outer tubing is greater than the outer diameter of the inner tubing, the outer diameter of the inner tubing is greater than the outer diameter of the fiber, and the outer diameter of the outer tubing is less than twice the outer diameter of the optical element.

The miniature probe is manufactured through a novel process. First, a coating is stripped from a portion of a fiber and an end face is prepared. Preparing the end face involves cleaving and/or polishing the end face of the fiber. Next, the end face of the fiber is fused to an end face of a lens. Next, the fiber is inserted into an inner tubing. Next, the inner tubing is inserted into an outer tubing. Next, an optical element is inserted into the outer tubing such that the lens is disposed between the fiber and the optical element.

The fusing may not involve any adhesive material. The optical element may be a reflective surface or a beam splitter. The lens may be a Gradient-Index (GRIN) lens or a ball lens. The fiber may be a single mode fiber (SMF), a multimode fiber (MMF), or a double-clad fiber (DCF). The end face of the fiber, the lens, and the optical element may be enclosed within the outer tubing, wherein the outer tubing is transparent, and a portion of the inner tubing may be disposed between the fiber and the outer tubing. The method may further include delivering or receiving light via the optical element such that an optical path extends between the fiber, lens, and optical element.

Further details and embodiments and methods are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
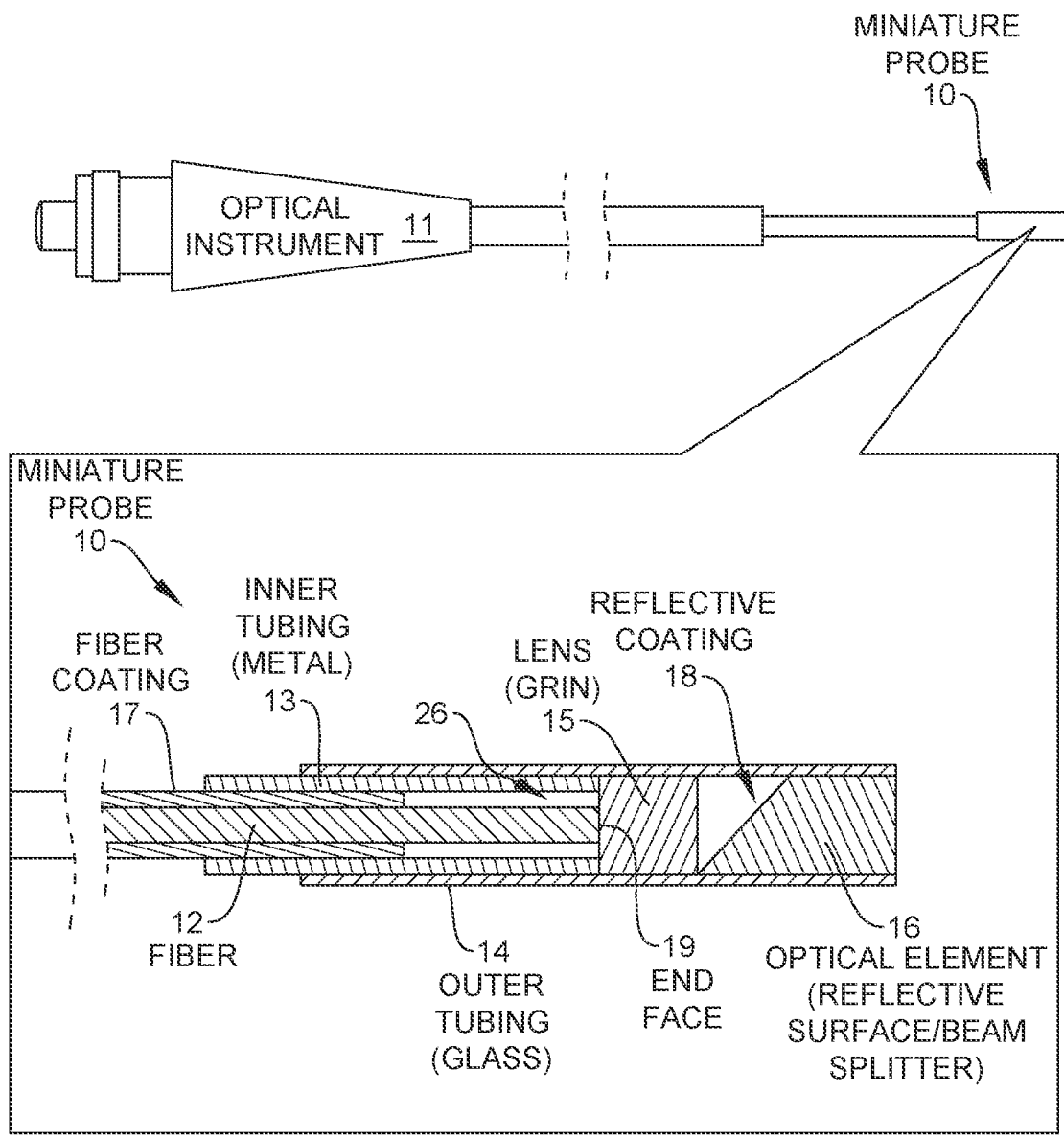
FIG. 1 is a diagram of a miniature probe 10 in accordance with one embodiment.

FIG. 1 is a diagram of a miniature probe 10 in accordance with one embodiment. The miniature probe 10 is attached to an optical instrument 11. In various applications, the optical instrument 11 receives or delivers light via the miniature probe 10. In accordance with at least one novel aspect, the miniature probe 10 does not introduce any epoxy or other adhesive material that might contaminate an optical path between the optical instrument 11 and an external environment.

A portion of the fiber 12 is enclosed within an inner tubing 13. A portion of the inner tubing 13 is enclosed within an outer tubing 14. An end face 19 of the fiber 12 is fused to a lens 15. The lens 15 is disposed between the fiber 12 and an optical element 16. The optical element 16 is coated with a reflective coating 18. The fiber 12 is coated with a fiber coating 17. A stripped portion of the fiber 12 is stripped of fiber coating 17. The stripped portion of the fiber 12 is enclosed within the inner tubing 13 and the outer tubing 14. The inner tubing 13 and outer tubing 14 provide structural support and protection for the internal components of the miniature probe 10.

In one embodiment, the lens 15 is a Gradient-Index (GRIN) lens. In another embodiment, the lens 15 is a ball lens. In yet other embodiments, the lens is any lens capable of being provided in miniature form. The choice of lens type is selected depending on the specific application of optical instrument 11 and on the type of fiber that is used. The fiber 12 can be a single mode fiber (SMF), a multimode fiber (MMF), or a double-clad fiber (DCF), depending on the specific requirements of the application.

In forming the miniature probe 10, the end face of the fiber 12 is fused to an end face of the lens 15. The novel fusion process does not involve any adhesive material which can potentially contaminate the optical path. Instead, the fusion process ensures a seamless connection between the fiber 12 and the lens 15, facilitating precise alignment and secure attachment.

The optical element 16 can be a reflective surface or mirror, a beam splitter, a dichroic mirror, an optical filter, or other optical element having predetermined reflective or transmission properties. In the case of a reflective surface, the optical element 16 reflects light at a predetermined angle. When the optical element 16 is a beam splitter, the beam splitter splits the incoming light into two separate beams, each traveling in a different direction. The beam splitter tends to be useful in light delivery applications.

The end face of the fiber 12, the lens 15, and the optical element 16 are enclosed within the outer tubing 14. The outer tubing 14 is transparent and permits light to pass through it. A portion of the inner tubing 13 is disposed between the fiber 12 and the outer tubing 14 thereby providing additional structural support. In various embodiments, the inner tubing 13 is formed from metal, glass, ceramic, or other material.

The fiber 12, the inner tubing 13, the outer tubing 14, and the optical element 16 each have an outer diameter. The outer diameter of the outer tubing 14 is greater than the outer diameter of the inner tubing 13. The outer diameter of the inner tubing 13 is greater than the outer diameter of the fiber 12. In one embodiment, the outer diameter of the outer tubing 14 is less than twice the outer diameter of the optical element 16. In another embodiment, the outer diameter of the outer tubing 14 is less than twice the outer diameter of the lens 15. This arrangement ensures that the components of the miniature probe 10 fit together in a compact and efficient manner. In one embodiment, the outer diameter of the outer tubing 14 is less than 1.50 millimeters. In another embodiment, the outer diameter of the outer tubing 14 is less than 1.25 millimeters. In yet another embodiment, the outer diameter of the outer tubing 14 is less than 1.00 millimeters.

Figure 2:
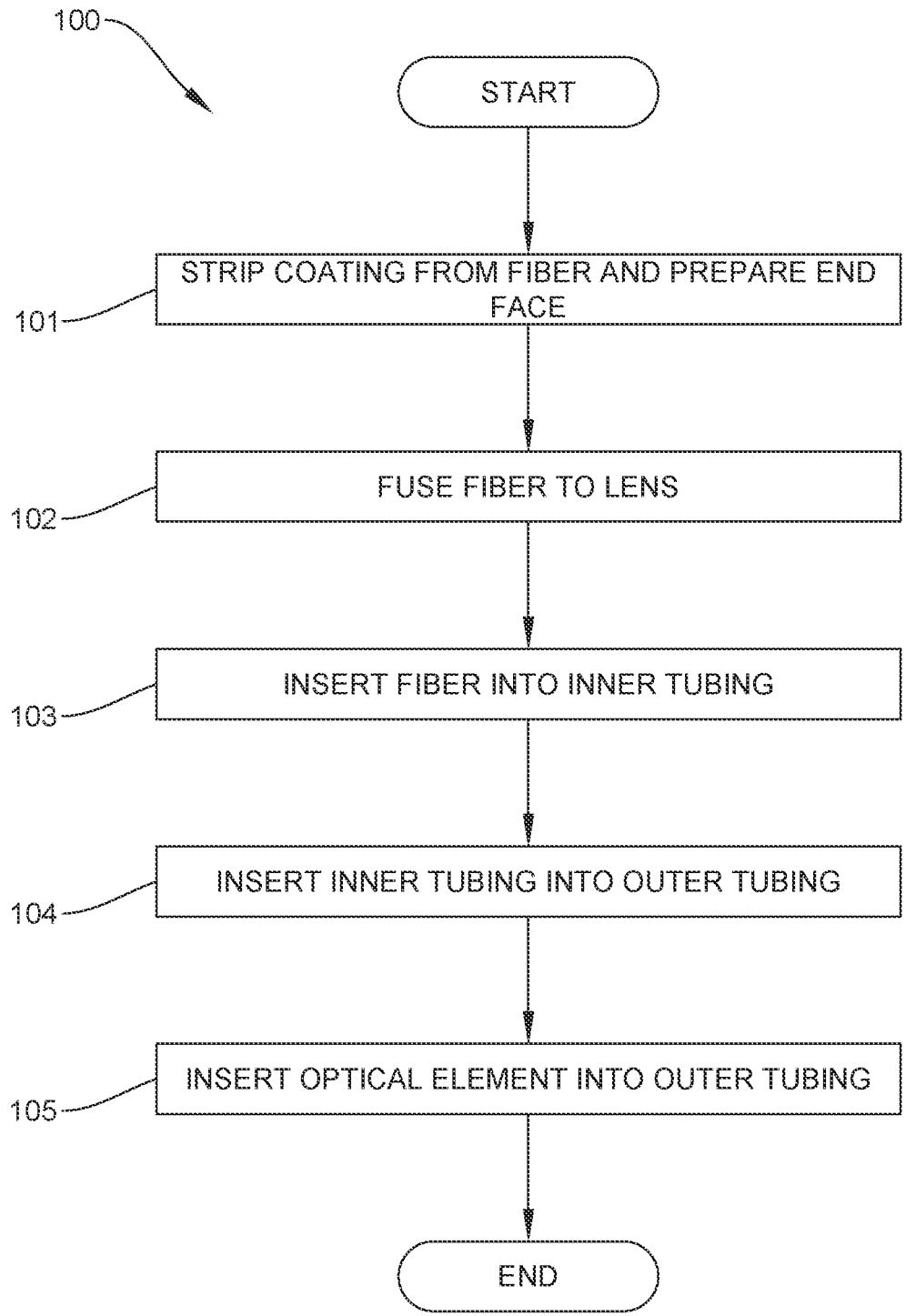
FIG. 2 is a flowchart of a method 100 for forming a miniature probe in accordance with at least one novel aspect.

FIG. 2 is a flowchart of a method 100 for forming a miniature probe in accordance with at least one novel aspect. The method 100 begins with the step 101 of stripping the coating from a portion of a fiber and preparing an end face of the fiber. In step 101, the fiber coating 17 is removed from the fiber 12. A fiber cutter is used to cleave an end portion of the fiber. The end face 19 is polished to a flat, planar surface for coupling to lens 15 thereby providing optimal light transmission between the fiber 12 and the lens 15.

Following the stripping of the coating and preparation of the end face (step 101), the method 100 proceeds to the step 102 of fusing the end face of the fiber to an end face of the lens. In this step, the end face of the fiber 12 is fused to the end face of the lens 15. By using a fusion process, the end face of the fiber 12 is coupled to the end face of the lens 15 without any adhesive material and without potentially contaminating the optical path through the fiber 12 and the lens 15. Instead, the fusion process ensures a seamless connection between the fiber 12 and the lens 15, facilitating precise alignment and secure attachment. In this embodiment, the fusion process involves the application of heat, typically between 600 to 1000 degrees Celsius, to the end faces of the fiber 12 and the lens 15, causing them to melt and fuse together.

After the fusion of the fiber and the lens (step 102), the method 100 continues to the step 103 of inserting the fiber into an inner tubing. In this step, the fiber 12, now fused to the lens 15, is inserted into the inner tubing 13. The inner tubing 13 provides structural support for the fiber 12 and the lens 15 and also serves as a protective casing.

Next, in step 104, the inner tubing is inserted into an outer tubing. The inner tubing 13, containing the fiber 12 and the lens 15, is inserted into the outer tubing 14. The outer tubing 14 provides an additional layer of protection for the internal components of the miniature probe, and also allows light to pass through due to its transparency.

Finally, in step 105, an optical element is inserted into the outer tubing such that the lens is disposed between the fiber and the optical element. The optical element (e.g., reflective surface or beam splitter) 16 is inserted into the outer tubing 14, with the lens 15 disposed between the fiber 12 and the optical element 16. The optical element 16 can be a reflective surface or a beam splitter, depending on the specific requirements of the application.

In some embodiments, the method 100 may involve additional steps or variations. For instance, the lens 15 used in the fusion process could be a Gradient-Index (GRIN) lens, a ball lens, or another type of lens suitable for the specific application and type of fiber used. Similarly, the fiber 12 could be a single mode fiber (SMF), a multimode fiber (MMF), or a double-clad fiber (DCF), depending on the specific requirements of the application. Furthermore, the optical element 16 could be a reflective surface or a beam splitter, depending on whether the miniature probe is intended for light delivery, light capture, or both.

Figure 3:
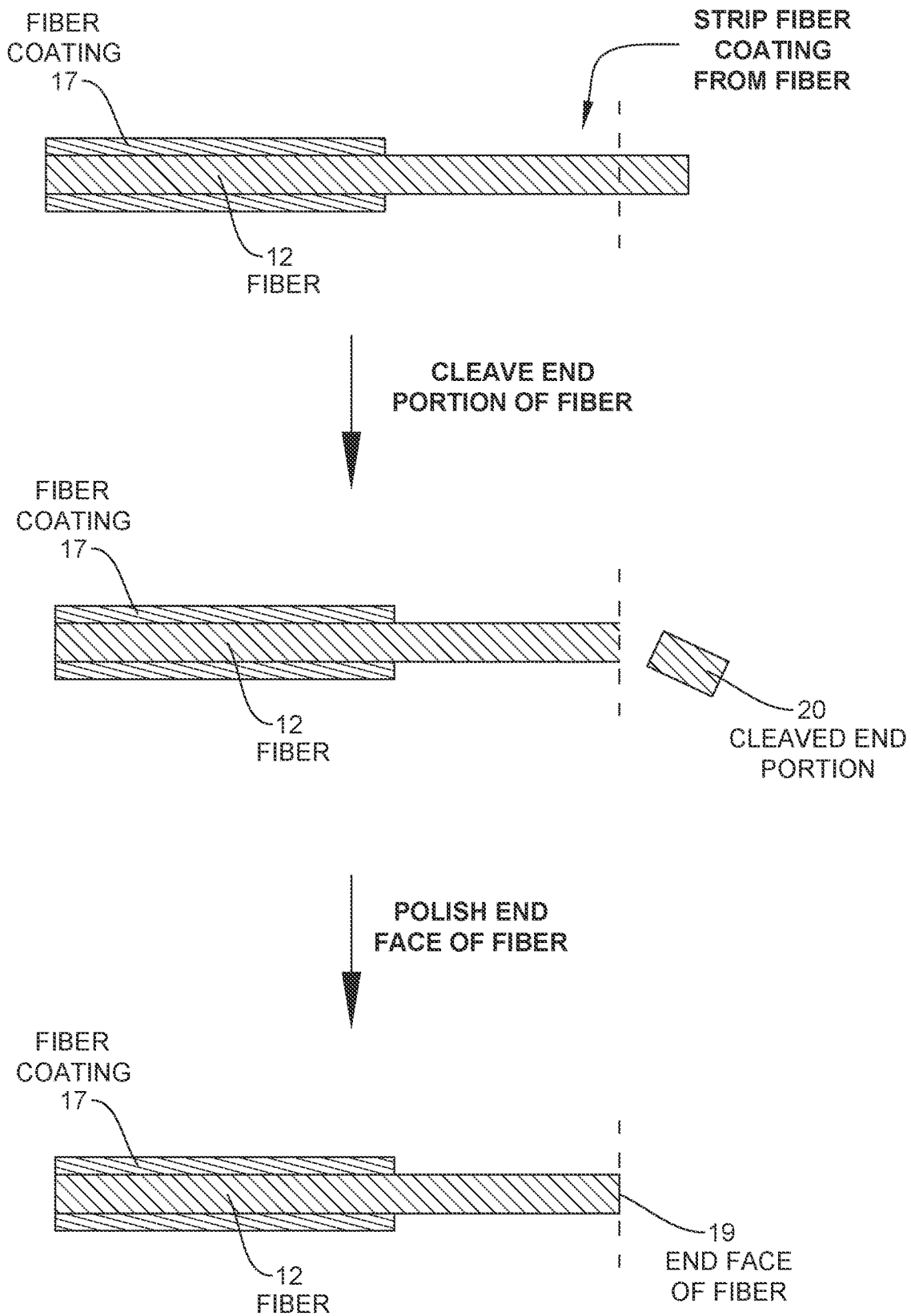
FIG. 3 is a side view of the novel assembly process step 101 of stripping fiber coating 17 from the fiber 12 and preparing the end face 19.

FIG. 3 is a side view of the novel assembly process step 101 of stripping fiber coating 17 from the fiber 12 and preparing the end face 19. The fiber 12 includes a fiber coating 17. The fiber coating 17 is stripped from the fiber 12. A fiber cutter (not shown) is used to cleave an end portion 20 from the fiber 12 without damaging fiber 12. The end face 19 is polished thereby yielding a flat end surface that is ready to be fused to lens 15. In one example, the end face 19 is polished using one or more of a rough grit coarse polishing film (twelve to fifteen micron grit), a fine polishing film (three micron grit), or a finer film (one micron grit or less). The planar end face 19 ensures optimal light transmission between the fiber 12 and the lens 15.

The fiber coating 17 is typically made of plastic and has a lower melting temperature than the fiber 12. If the fiber coating 17 were not stripped, then application of heat during the fiber-lens fusion process could potentially introduce melted coating material at the fiber-lens junction. To avoid such contamination, the fiber coating 17 is stripped from the fiber 12 before the fiber-lens fusion process.

In some embodiments, the fiber 12 used in the assembly process could be a single mode fiber (SMF). Single mode fibers are designed to carry light directly down the fiber. Single mode fibers are used for long-distance signal transmission and have a small core diameter. Single mode fibers allow light to be transmitted through the center of the fiber.

In another embodiment, the fiber 12 is a multimode fiber (MMF). Multimode fibers have a larger core diameter than single mode fibers and are designed to carry multiple light rays or modes at the same time. Multimode fibers are typically used for short-distance signal transmission, such as within a building or on a campus.

In yet another embodiment, the fiber 12 is a double-clad fiber (DCF). Double-clad fibers have a core for transmitting light, an inner cladding with a larger diameter that captures reflected light effectively, and an outer cladding with a lower refractive index to confine light within an inner cladding and a core. DCF fibers are typically used in high-power applications.

The choice of fiber type can be based on the specific requirements of the application. For instance, a single mode fiber might be used for long-distance signal transmission, a multimode fiber for short-distance signal transmission, and a double-clad fiber for high-power applications. Regardless of the type of fiber used, the fiber coating 17 is stripped from the fiber 12 before the fusion process begins to prevent contamination of the fusion process.

Figure 4:
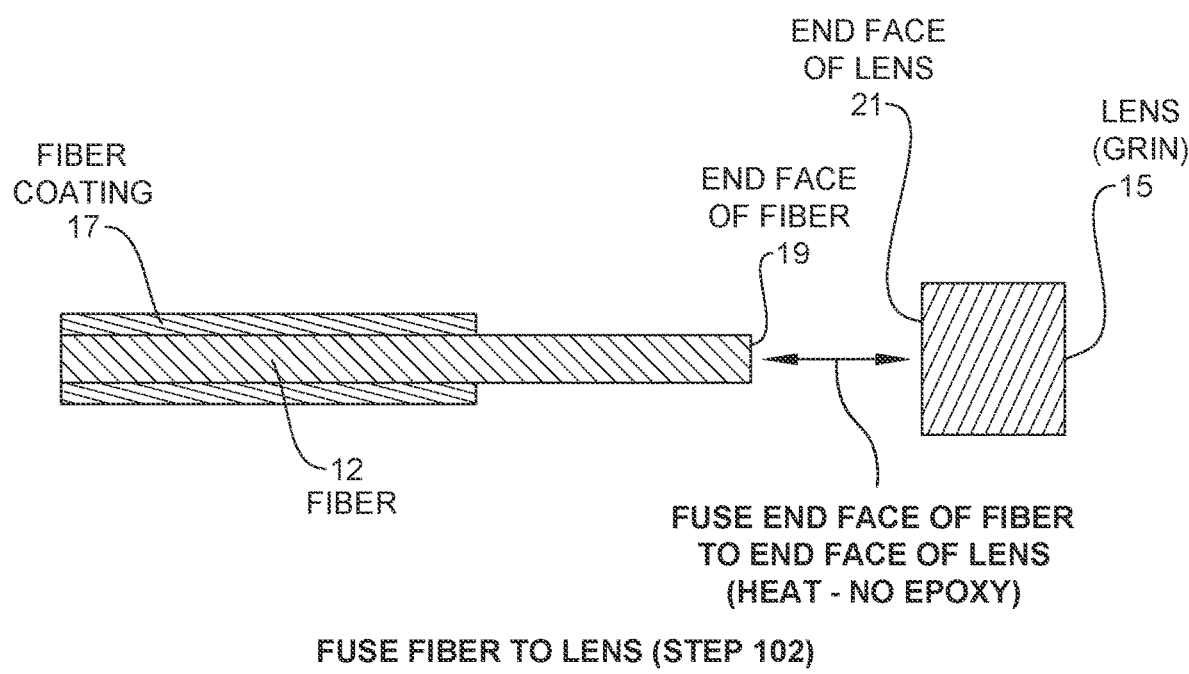
FIG. 4 is a side view of the novel assembly process step 102 of fusing the fiber 12 to the lens 15.

FIG. 4 is a side view of the novel assembly process step 102 of fusing the fiber 12 to the lens 15. The end face 19 of the fiber 12 is fused to an end face 21 of the lens 15 without the use of adhesive materials. This configuration facilitates the precise alignment and secure attachment of the fiber 12 to the lens 15.

In some embodiments, the lens 15 may be a Gradient-Index (GRIN) lens. A GRIN lens is characterized by a refractive index that varies radially from the center of the lens to its circumference. This variation in refractive index allows the lens to focus light in a manner similar to a conventional lens but with flat surfaces. The flat surface of the GRIN lens tends to simplify the manufacturing process and reduces the potential for optical aberrations.

In another embodiment, the lens 15 is a ball lens. A ball lens is a spherical lens that can focus light in a manner similar to a conventional lens. The choice of lens type can be based on the specific application and type of fiber used. For instance, a GRIN lens might be used for applications requiring precise control over the focus of the light, while a ball lens might be used for applications requiring a broader focus.

In accordance with at least one novel aspect, heat is used to fuse the end face 19 of the fiber 12 to the end face 21 of the lens 15. This novel fusion process does not involve any adhesive material. Adhesive materials might potentially contaminate the optical path and undesirable impact light transmission. Instead, the fusion process ensures a seamless connection between the fiber 12 and the lens 15, facilitating precise alignment and secure attachment. The fusion process involves the application of heat, typically between 600 to 1000 degrees Celsius, to the end faces 19 and 21 causing them to melt and fuse together.

In various embodiments, the fiber 12 used in the fusion process could be a single mode fiber (SMF), a multimode fiber (MMF), or a double-clad fiber (DCF). Regardless of the type of fiber used, the fiber coating 17 is stripped from the fiber 12 before the fusion process begins to prevent contamination of the fusion process.

Figure 5:
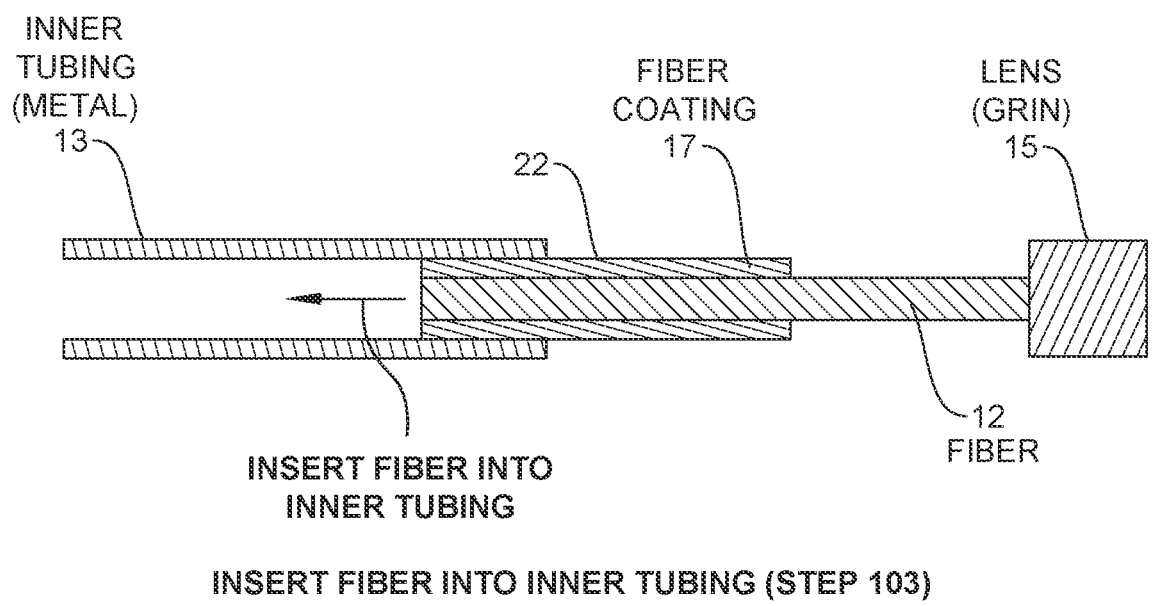
FIG. 5 is a side view of the novel assembly process step 103 of inserting the fiber 12 into inner tubing 13.

FIG. 5 is a side view of the novel assembly process step 103 of inserting the fiber 12 into inner tubing 13. Portion of fiber 12 that is coated with a fiber coating 17 is inserted into an inner tubing 13. During insertion, the inner tubing 13 slides over upper surface 22 of the fiber coating 17 as the inner tubing 13 is drawn towards the lens 15. In this embodiment, the fiber 12 is inserted into the inner tubing 13 after the fiber coating 17 has been stripped from a portion of the fiber 12.

An air gap 26 (see FIG. 1) is present between the fiber 12 and the inner tubing 13. The air gap 26 ensures that there is no direct contact between the fiber 12 and the inner tubing 13 thereby reducing the potential for mechanical stress on the fiber 12. In some cases, the air gap may also serve to improve the optical performance of the miniature probe 10 by reducing unwanted reflections or refractions of light.

In another embodiment, the fiber 12 is inserted into the inner tubing 13 with the fiber coating 17 still intact. The fiber coating 17 is stripped from the fiber 12 after the fiber 12 has been inserted into the inner tubing 13. This sequence of steps may be used in applications where the fiber coating 17 provides additional protection for the fiber 12 during the insertion process.

Figure 6:
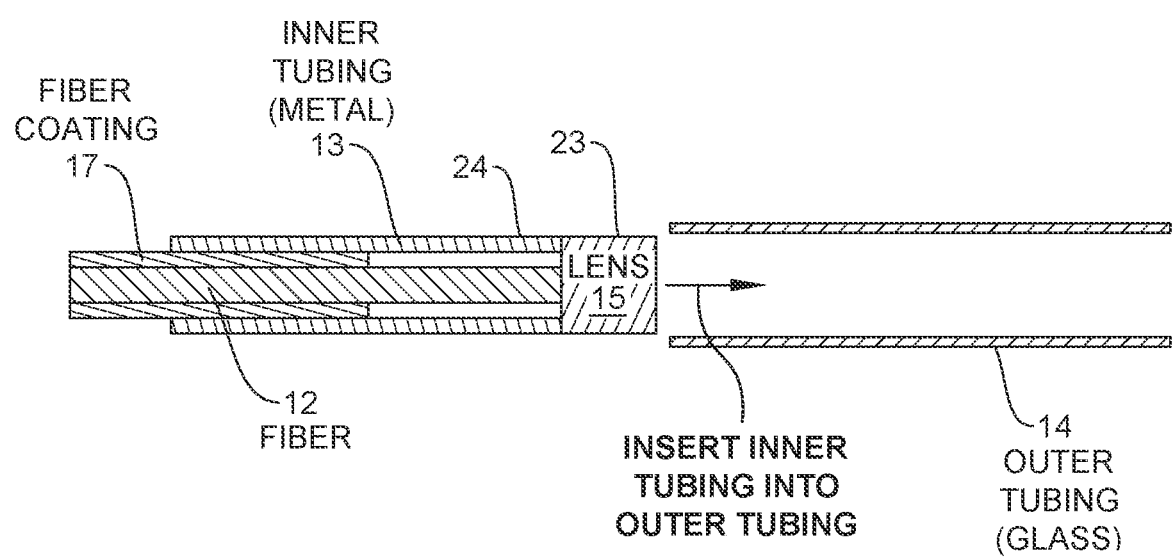
FIG. 6 is a side view of the novel assembly process step 104 of inserting inner tubing 13 into outer tubing 14.

FIG. 6 is a side view of the novel assembly process step 104 of inserting inner tubing 13 into outer tubing 14. During insertion, the outer tubing 14 slides over upper surface 23 of the lens 15 and the outer tubing 14 also slides over upper surface 24 of the inner tubing 13. After insertion, part of the inner tubing 13 is disposed between the fiber 12 and the outer tubing 14. The outer tubing 14 provides additional structural support for the fiber 12 and the lens 15. Additionally, the outer tubing 14 provides a protective casing that minimizes damage to fiber 12 during field operation.

The inner tubing 13 is formed from metal, glass, ceramic, or other materials suitable to provide robustness and durability to the miniature probe 10. The outer tubing 14 is formed from durable material capable of transmitting light. The combination of materials ensures that the optical components are well-protected while allowing for efficient light transmission. In this embodiment, the inner tubing 13 is formed from metal and the outer tubing 14 is formed from glass. The glass outer tubing 14 readily permits light to pass through.

In another embodiment, the inner tubing 13 is not formed from metal and is formed from another material that provides robustness and durability to the miniature probe 10. In yet another embodiment, the outer tubing 14 is not formed from glass and is formed from another transparent material.

The process of inserting the inner tubing 13 into the outer tubing 14 involves careful alignment of the components. In some cases, a fixture at a 45-degree angle is used to assist in the assembly process. This fixture helps to guide the inner tubing 13 into the outer tubing 14 and ensures that components are properly aligned. This alignment is particularly relevant when inserting the optical element (e.g., reflective surface or beam splitter) 16 into the glass tubing 14. The optical element 16 is positioned such that the lens 15 is disposed between the fiber 12 and the optical element 16. This arrangement ensures that the optical path extends between the fiber 12, lens 15, and optical element 16 without any epoxy present along the optical path.

In various embodiments, the optical element 16 can be a reflective surface or a beam splitter. When the optical element 16 is a reflective surface, it reflects light at a predetermined angle. When the optical element 16 is a beam splitter, the beam splitter splits the incoming light into two separate beams. Each of the separated beams travels in a different direction.

Figure 7:
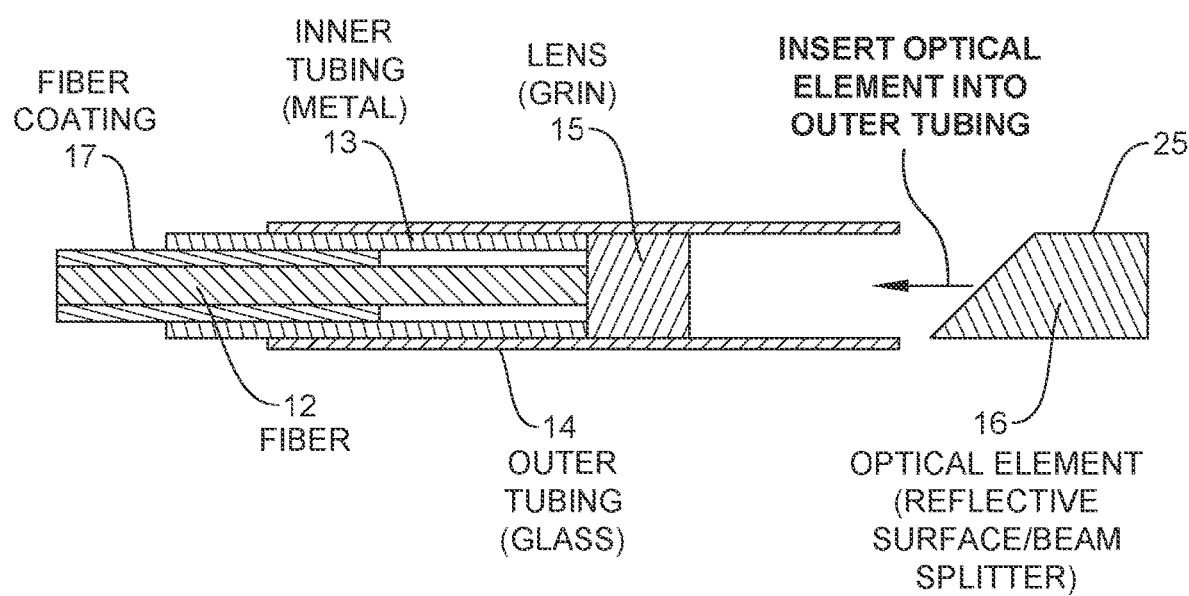
FIG. 7 is a side view of the novel assembly process step 105 of inserting optical element 16 into outer tubing 14.

FIG. 7 is a side view of the novel assembly process step 105 of inserting optical element 16 into outer tubing 14. The outer tubing 14 slides over upper surface 25 of the optical element 16. After insertion, the outer tubing 14 surrounds the optical element 16, lens 15, and part of the inner tubing 13.

In various embodiments, the optical element 16 is coated with a gold coating. The gold coating provides a reflective surface for the optical element 16. The gold coating reflects light at a predetermined angle. In addition, the gold coating has a wide operating wavelength, making the gold coating suitable for a variety of applications.

The assembly process involves the application of epoxy at specific locations. In some embodiments, epoxy is applied on the back end of the optical element 16 to act as a stopper.

This application technique ensures that the optical element 16 does not slide back once it is inserted into the outer tubing 14. Importantly, the epoxy is applied in such a way that it does not contaminate the optical path. The optical path extends between the fiber 12, lens 15, and optical element 16.

Figure 8:
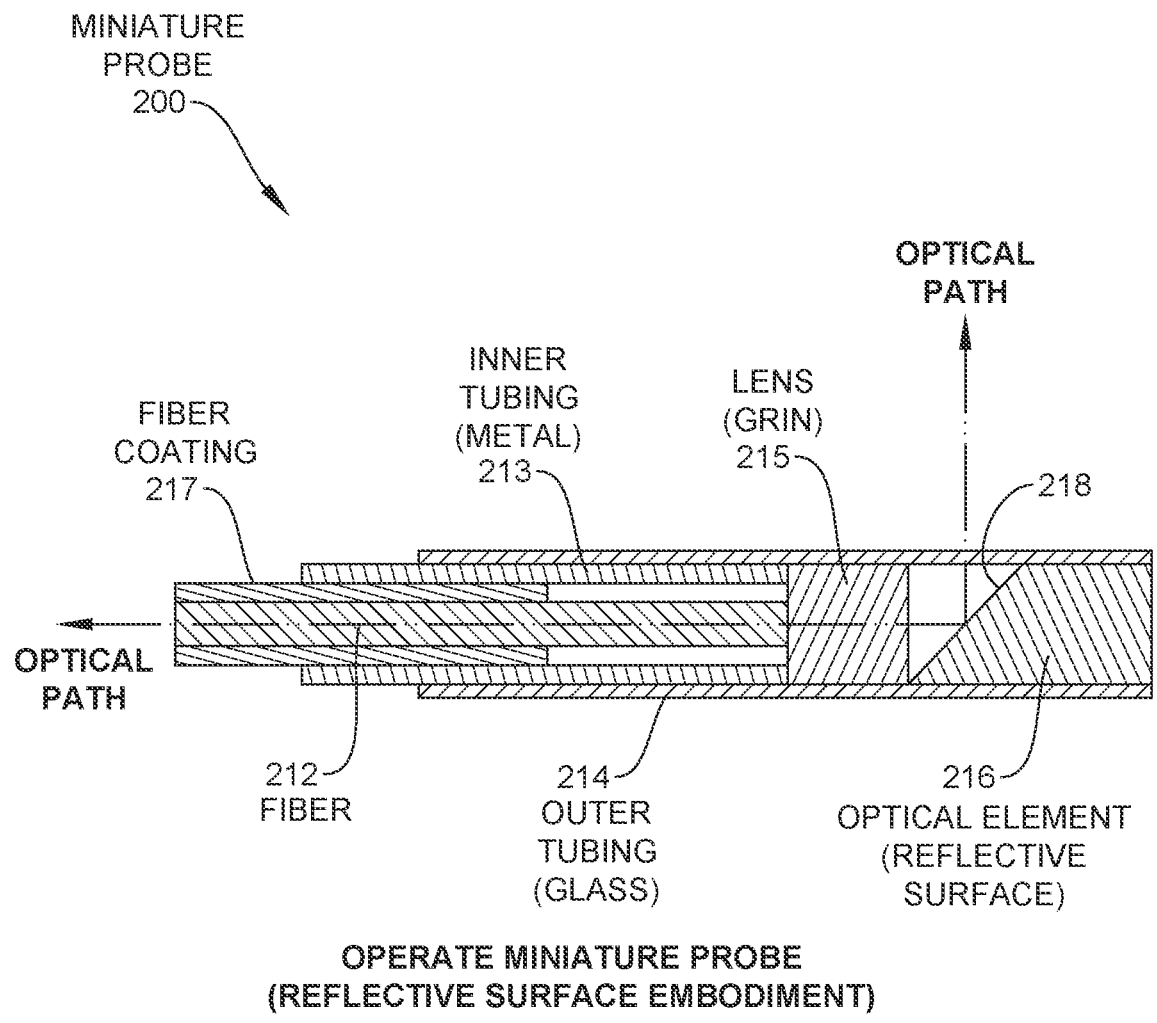
FIG. 8 is a side view of a miniature probe 200 having a reflective optical element 216 in accordance with another embodiment.

FIG. 8 is a side view of a miniature probe 200 having a reflective optical element 216 in accordance with another embodiment. To form the miniature probe 200 with reflective optical element 216, a fiber 212 is stripped of fiber coating 217 and an endface of the fiber 212 is prepared by cleaving and/or polishing. Next, the fiber 212 is inserted into an inner tubing 213. Next, the inner tubing 213 is inserted into an outer tubing 214. Next, the lens 215 is positioned at the end of the fiber 212 and is fused to the fiber 212 without any adhesive material. Next, the reflective optical element 216 is inserted into the outer tubing 214 such that the lens 215 is disposed between the fiber 212 and the reflective optical element 216.

The end face of the fiber 212, the lens 215, and the optical element 216 are enclosed within the outer tubing 214. The outer tubing 214 is transparent, allowing light to pass through it. A portion of the inner tubing 213 is disposed between the fiber 212 and the outer tubing 214, providing additional structural support and protection for the internal components of the miniature probe 200.

In this embodiment, the optical element 216 provides a reflective surface 218. The reflective surface 218 is formed from any suitable reflective material. The reflective surface 218 reflects light at a predetermined angle thereby directing light along a predetermined path. The reflective surface 218 is useful in applications where light delivery is desired, such as in laser treatments or optical communications. The reflective surface 218 comprises a reflective coating, such as gold coating.

Figure 9:
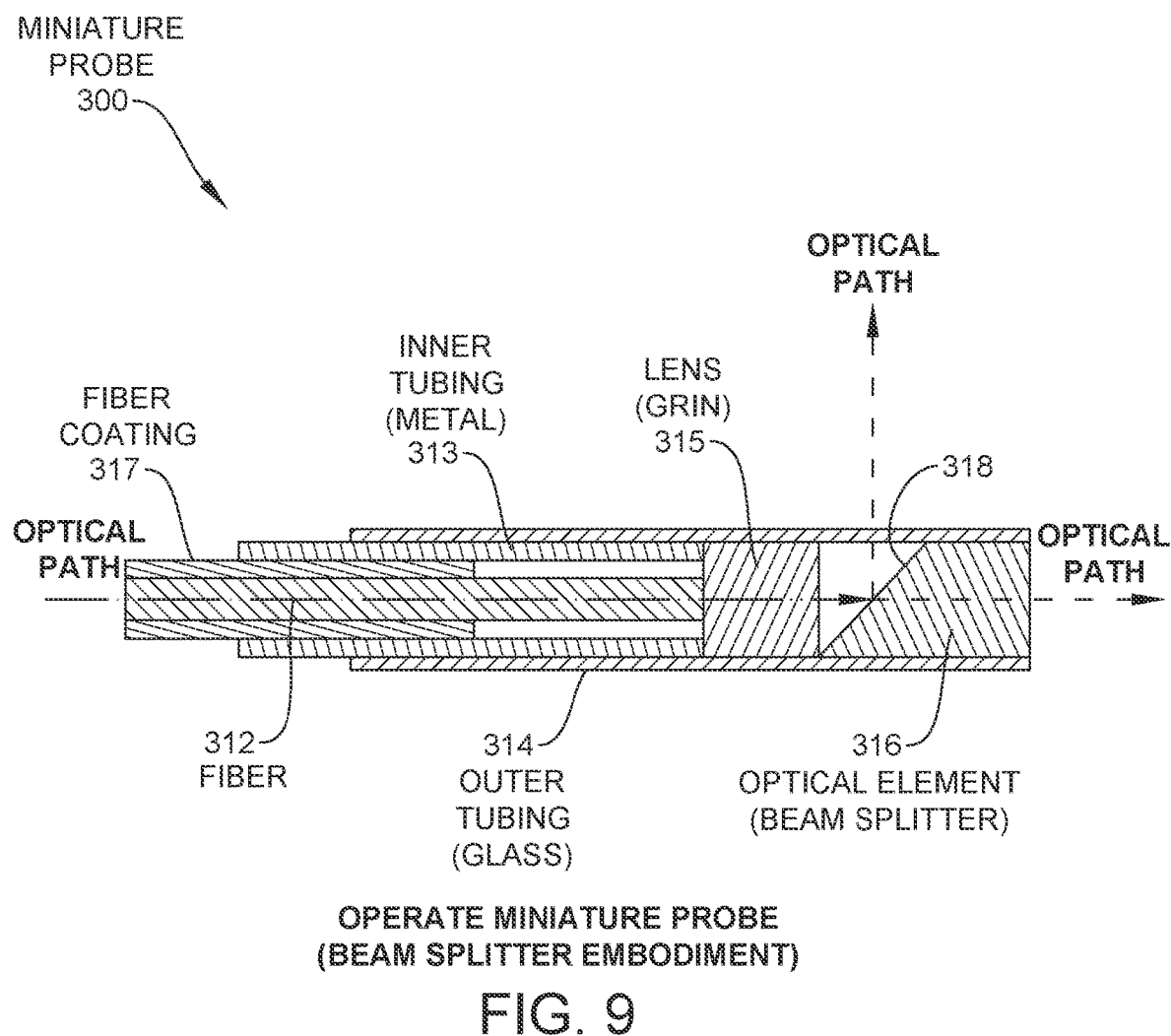
FIG. 9 is a side view of a miniature probe 300 having a beam splitting optical element 316 in accordance with another embodiment.

FIG. 9 is a side view of a miniature probe 300 having a beam splitting optical element 316 in accordance with another embodiment. To form the miniature probe 300 with beam splitting optical element 316, a fiber 312 is stripped of fiber coating 317 and an endface of the fiber 312 is prepared by cleaving and/or polishing. Next, the fiber 312 is inserted into an inner tubing 313. Next, the inner tubing 313 is inserted into an outer tubing 314. Next, the lens 315 is positioned at the end of the fiber 312 and is fused to the fiber 312 without any adhesive material. Next, the beam splitting optical element 316 is inserted into the outer tubing 314 such that the lens 315 is disposed between the fiber 312 and the beam splitting optical element 316.

The end face of the fiber 312, the lens 315, and the optical element 316 are enclosed within the outer tubing 314. The outer tubing 314 is transparent, allowing light to pass through it. A portion of the inner tubing 313 is disposed between the fiber 312 and the outer tubing 314, providing additional structural support and protection for the internal components of the miniature probe 300.

In this embodiment, the optical element 316 is a beam splitter. The beam splitter 316 is any suitable structure operable to split light received onto surface 318 into two separate beams, each traveling in a different direction. The beam splitting optical element 316 is useful in applications where both light delivery and capture are desired. For instance, in a medical or cosmetic treatment device, one beam could be used to deliver treatment, while the other beam could be used to capture images or data.

In other embodiments, alternative methods and materials are used in the assembly and operation of the miniature probe 10. For instance, soldering could be used as an alternative to epoxy for assembling optical components. In this case, all the parts with gold plating, such as the optical element 16, are joined together using solder. This method could potentially provide a more robust and durable connection between the components, especially in high-temperature environments.

In yet other embodiments, the optical element 16 could be a parabolic reflector. A parabolic reflector has a curved shape that can focus light into a single point or parallel rays, depending on the specific requirements of the application. The parabolic reflector is useful in applications requiring precise control over the focus of the light.

In still other embodiments, the miniature probe 10 functions in dual modes-delivering and capturing light. The dual mode miniature probe provides bidirectional functionality in which light is delivered via the optical element 16 in a first mode and light is received via the optical element 16 in a second mode. For instance, in a medical or cosmetic treatment device, the first mode operates to deliver treatment and the second mode operates to capture images or data. This dual mode functionality increases the application scope of the novel miniature probe.

In some cases, a splice machine could be used for the fusing process. A splice machine is a specific type of equipment designed to fuse optical fibers together. It uses heat to melt the ends of the fibers and then pushes them together to form a single fiber. This method could potentially provide a more precise and reliable fusion of the fiber 12 to the lens 15.

In other cases, glass is used as an alternative material for the optical element 16. Glass has excellent optical properties and can be easily shaped and polished to form a reflective surface or a beam splitter. In the case of a glass optical element, a suitable adhesive or mechanical fastening method is used to secure the glass optical element within the outer tubing 14.

Although certain specific embodiments are described above for instructional purposes, the teachings of this patent document have general applicability and are not limited to the specific embodiments described above. For example, in other embodiments, lens 15 is another type of optical element and the fiber 12 is fused to this other type of optical element. Accordingly, various modifications, adaptations, and combinations of various features of the described embodiments can be practiced without departing from the scope of the invention as set forth in the claims.

What is claimed is:

1. An apparatus comprising: a fiber, wherein the fiber is non-rotating; a lens, wherein an end face of the fiber is fused to an end face of the lens; an optical element, wherein the lens is disposed between the fiber and the optical element; and further comprising: an outer tubing, wherein the end face of the fiber, the lens, and the optical element are enclosed within the outer tubing, and wherein the outer tubing is transparent.

2. The apparatus of claim 1, wherein an optical path extends between the fiber, lens, and optical element, and wherein no epoxy is present along the optical path.

3. The apparatus of claim 1, wherein the optical element is a reflective surface having a predetermined angle of reflection.

4. The apparatus of claim 1, wherein the optical element is a beam splitter.

5. The apparatus of claim 1, wherein the fiber is coupled to the lens without any intermediate adhesive material.

6. The apparatus of claim 1, wherein the lens is selected from the group consisting of: a Gradient-Index (GRIN) lens and a ball lens.

7. The apparatus of claim 1, wherein the fiber is selected from the group consisting of: a single mode fiber (SMF), a multimode fiber (MMF), and a double-clad fiber (DCF).

8. The apparatus of claim 1, further comprising:
an inner tubing, wherein a portion of the inner tubing is disposed between the fiber and the outer tubing.

9. An apparatus comprising:
a fiber, wherein the fiber has an outer diameter;
a lens, wherein an end face of the fiber is fused to an end face of the lens;
an optical element, wherein the lens is disposed between the fiber and the optical element and wherein the optical element has an outer diameter;
an outer tubing, wherein the end face of the fiber, the lens, and the optical element are enclosed within the outer tubing, wherein the outer tubing is transparent, wherein the outer tubing has an outer diameter, and wherein the outer diameter of the outer tubing is less than twice the outer diameter of the optical element; and
an inner tubing, wherein a portion of the inner tubing is disposed between the fiber and the outer tubing, wherein the inner tubing has an outer diameter, wherein the outer diameter of the inner tubing is greater than the outer diameter of the fiber, and wherein the outer diameter of the outer tubing is greater than the outer diameter of the inner tubing.

10. An apparatus comprising: a fiber, wherein the fiber is a multimode fiber; a lens, wherein an end face of the fiber is fused to an end face of the lens; an optical element, wherein the lens is disposed between the fiber and the optical element; and further comprising: an outer tubing, wherein the end face of the fiber, the lens, and the optical element are enclosed within the outer tubing, and wherein the outer tubing is transparent.

11. The apparatus of claim 10, wherein an optical path extends between the fiber, lens, and optical element, and wherein no epoxy is present along the optical path.

12. The apparatus of claim 10, wherein the optical element is a reflective surface having a predetermined angle of reflection.

13. The apparatus of claim 10, wherein the optical element is a beam splitter.

14. The apparatus of claim 10, wherein the fiber is coupled to the lens without any intermediate adhesive material.

15. The apparatus of claim 10, wherein the lens is selected from the group consisting of: a Gradient-Index (GRIN) lens and a ball lens.

16. The apparatus of claim 10, further comprising:
an inner tubing, wherein a portion of the inner tubing is disposed between the fiber and the outer tubing.

17. The apparatus of claim 16, wherein the fiber has an outer diameter, wherein the inner tubing has an outer diameter, wherein the outer tubing has an outer diameter, wherein the optical element has an outer diameter, wherein the outer diameter of the outer tubing is greater than the outer diameter of the inner tubing, wherein the outer diameter of the inner tubing is greater than the outer diameter of the fiber, and wherein the outer diameter of the outer tubing is less than twice the outer diameter of the optical element.

* * * * *